July 21, 1936.   C. A. PIERCY   2,048,516
REEL FOR FLUID FILLED CABLES
Original Filed Nov. 22, 1929

Inventor:
Carl A. Piercy,
by Harry E. Dunham
His Attorney.

Patented July 21, 1936

2,048,516

UNITED STATES PATENT OFFICE 2,048,516

REEL FOR FLUID FILLED CABLES

Carl A. Piercy, Ballston Lake, N. Y., assignor to General Electric Company, a corporation of New York Original application November 22, 1929, Serial No. 409,116. Divided and this application January 19, 1934, Serial No. 707,310

4 Claims. (Cl. 173—266)

The present application is a division of my Patent No. 1,970,393, issued on August 14, 1934, application Serial No. 409,116, filed November 22, 1929.

The present invention relates to reels for fluid filled cables which may be used in the factory and also in transporting cables to the place of installation. The fluid which fills these cables expands and contracts with changes in temperature, and for that reason a compensating reservoir is required for preventing an increase of pressure of the fluid, due to a rise of temperature, from stretching the sheath and also to feed fluid back into the cable, due to a decrease of temperature, for preventing the formation of voids within the sheath.

The object of my invention is the provision of an improved reel for fluid filled cable in which a compensating reservoir is provided within the barrel of the reel in a manner to protect it and its associated parts from injury during handling in the factory and during transportation and storage prior to installation together with means whereby the reservoir may be installed in or removed from the reel without disturbing the structure of the reel or removing the cable therefrom.

For a consideration of what I believe to be novel and my invention, attention is directed to the accompanying description and the claims appended thereto.

Figure 1:
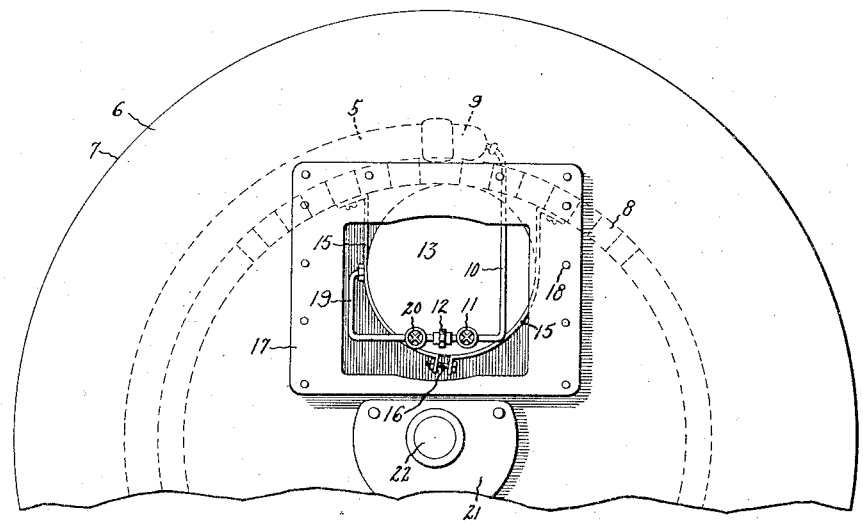
Figure 2:
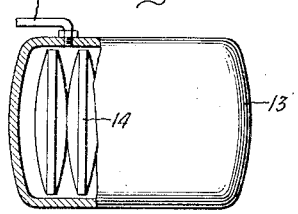

In the drawing, which is illustrative of my invention, Fig. 1 is a view in end elevation of a cable reel and reservoir with means for connecting the cable and reservoir, and Fig. 2 is a diagrammatic view of a reservoir.

5 indicates one end of a length of high tension cable of any ordinary or suitable construction which is sealed at its ends and filled with degasified fluid such as oil under pressure, which to obtain the best operating results should not be less than that of the atmosphere. The cable as shown is mounted on a shipping reel 6 having a barrel around which the cable is wound and enlarged flanges 7 which are of sufficient diameter to protect the cable from injury as the reel is rolled about. The barrel comprises a large number of pieces or cleats of wood or other material 8 arranged side by side and extending axially of the reel as indicated in dotted lines in Fig. 1 and supported by the end flanges 7.

To one of the ends of the cable is secured, as by a wiped joint, a cap 9 of suitable construction which seals the end thereof and which contains degasified oil or other fluid at the same pressure as that of the cable, usually at a pressure slightly above atmosphere. To this cap is secured a conduit 10 which also contains oil up to the shut-off valve 11, said conduit extending through an opening of suitable size formed in the barrel of the reel. On the conduit, beyond the valve, is screwed one-half of a union 12. The term "union" as employed herein is contemplated to comprehend all suitable forms of connecting means or devices for uniting the conduits which in turn are connected to the cable and to the reservoir without regard to the special form of the device itself.

13 indicates a variable capacity reservoir which contains means such as hermetically sealed cellular elements 14 which are capable of contracting when the oil in the cable expands and of expanding when the oil contracts. The space or chamber within the reservoir casing not occupied by the cells is filled with degasified oil under pressure slightly above atmosphere. The reservoir is located inside the barrel of the reel in a position eccentric to the axis of the reel, said reservoir substantially registering with an opening in one of the flanges of the reel. It is held against the inner wall of the barrel by spaced metal straps 15. The upper ends of these straps have feet which are bolted to the inside wall of the barrel. The lower ends of the straps have outturned ends in spaced relation and through which extends a clamping bolt 16. In one of the reel flanges is an opening, in this case rectangular, registering with the reservoir, and over it is a metal plate 17 having a central opening through which the reservoir may be inserted or removed and through which access may be had to the reservoir support, valves and other fittings. The plate is secured to the reel flange by screws 18, some of which are employed to secure a cover in place. As will be noted, the opening in the flange, the plate 17 and the reservoir are all eccentric with respect to the axis of the reel.

To the casing of the reservoir is connected a conduit 19 which is filled with the same oil up to the shut-off valve 20. To the outer end of the conduit is connected the other half of the union 12. The valves 11 and 20 are preferably as close to the union as can be conveniently done to reduce the air column in the conduit between them, as set forth in my aforesaid application. The valves 11 and 20 are normally open to permit the passage of oil between the reservoir and the cable.

To facilitate the winding and unwinding of the cable, metal hubs 21, of which one is shown, are bolted to the end flanges on the reel, each hub having a central opening 22 in which a supporting spindle may be inserted. Assuming the cable has been pulled into a conduit except for a relatively short piece or end on the reel, the next step is to remove the cover to expose the reservoir and then shut both valves 11 and 20 and open the union 12, thereby disconnecting the cable and reservoir. This will permit the conduit 10 which is flexible, the valve 11 and one-half of the union to be pulled upwardly through the opening in the barrel at the same time the inner end of the cable with its cap 9 is removed. The remaining portion of the cable may then be drawn into the conduit. The reservoir is removed from the reel through the plate 17 and the opening in the reel flange by releasing the clamping bolts 16 and bending or moving the lower ends of the straps outwardly away from the reservoir. This permits the reservoir to be lowered sufficiently to permit of its being withdrawn through the opening in the reel flange and plate by axial or endwise movement, after which it may be reconnected to the cable end in the manhole. In winding a cable on the reel, the conduit 10, valve 11 and one-half of the union 12, all of which are light in weight, are first inserted in place with the cap 9 lying on the peripheral surface of the barrel. Any suitable means may be employed to hold the inner end of the cable at the start of the winding operation.

In my aforesaid application of which this is a division, I have pointed out with particularity how the conduits 10 and 19 may be connected and the air removed from the union and portions of the conduits between the valves 11 and 20.

An advantage of my improved construction resides in the fact that the reservoir which of necessity has considerable weight and bulk can be inserted in place and removed without disturbing the structure of the reel itself. This is made possible by the presence of an opening in a side flange of the reel. The provision of said opening also permits access to the means for fastening the reservoir in position within the barrel of the reel. The opening also permits the reservoir, conduits, valves, etc. to be examined for leaks and repairs to be made and the valves manipulated. Cables of the character referred to are relatively stiff and hard to handle, especially in the field, and since the reservoir has considerable weight and bulk, it would be a difficult job and require very careful handling to remove a cable end and its reservoir from the reel as a unit. By arranging the parts as described, this difficulty is not present since the parts can be separated and removed independently, and this without permitting loss of oil or the admission of air or other foreign matter into the cable or the reservoir.

What I claim as new and desire to secure by Letters Patent of the United States is:

1. In combination a fluid containing cable, a reel therefor comprising a barrel made of cleats arranged side by side over which the cable is wound, said barrel having a conduit receiving opening, flanges secured to and supporting the barrel, one of said flanges having an opening located eccentric to the axis of rotation of the reel, a reservoir containing fluid under pressure located within the barrel adjacent the flange opening, which is smaller than the opening in the flange, a conduit connecting said cable with the reservoir to maintain the fluid pressure within the cable substantially constant, said conduit extending through the opening in the barrel, and means for disconnecting the conduit from the reservoir without releasing the pressure in the reservoir.

2. In combination a fluid containing cable, a reel therefor comprising a cylindrical barrel having a conduit receiving opening, flanges secured to opposite sides of the barrel for supporting it, one of said flanges having an opening in its side located between the axis of revolution of the reel and the periphery of the barrel, a fluid containing reservoir located within the barrel and substantially in line with the opening in the flange, supporting means for the reservoir located within the barrel, a conduit extending from the cable through the opening in the barrel, a second conduit within the barrel establishing communication between the first named conduit and the reservoir, and means for disconnecting said conduits without releasing the pressure in the reservoir.

3. In combination a fluid containing cable, a reel therefor, said reel comprising a cylindrical barrel made of cleats arranged side by side, said barrel having a conduit receiving opening, flanges secured to opposite sides of the barrel for supporting it, one of said flanges having an opening in its side located between the axis of the barrel and the periphery thereof, a variable capacity fluid containing reservoir located within the barrel and substantially in line with the opening in the flange, releasable means secured within the barrel for supporting the reservoir in fixed position, a conduit connected to an end of the cable and extending through the opening in the barrel, a second conduit within the barrel connected to the reservoir, a separable union connecting the two conduits, and a shut-off valve in each conduit on opposite sides of the union.

4. A cable reel comprising a cylindrical barrel to receive a cable, end flanges secured to and supporting the barrel, one of said flanges having an opening therein, a reservoir located within the barrel, releasable means for clamping the reservoir in fixed position inside of the barrel in substantial alignment with the opening in the flange to permit insertion and removal of said reservoir by a substantially axial movement, a conduit communicating with said reservoir and terminating in means for connecting the conduit to a cable to be applied to said reel, and valve means in said conduit adjacent said connecting means.

CARL A. PIERCY.